Jan. 13, 1953 F. H. DAVIS 2,624,938
GRASS EDGE CUTTER
Filed Sept. 28, 1950
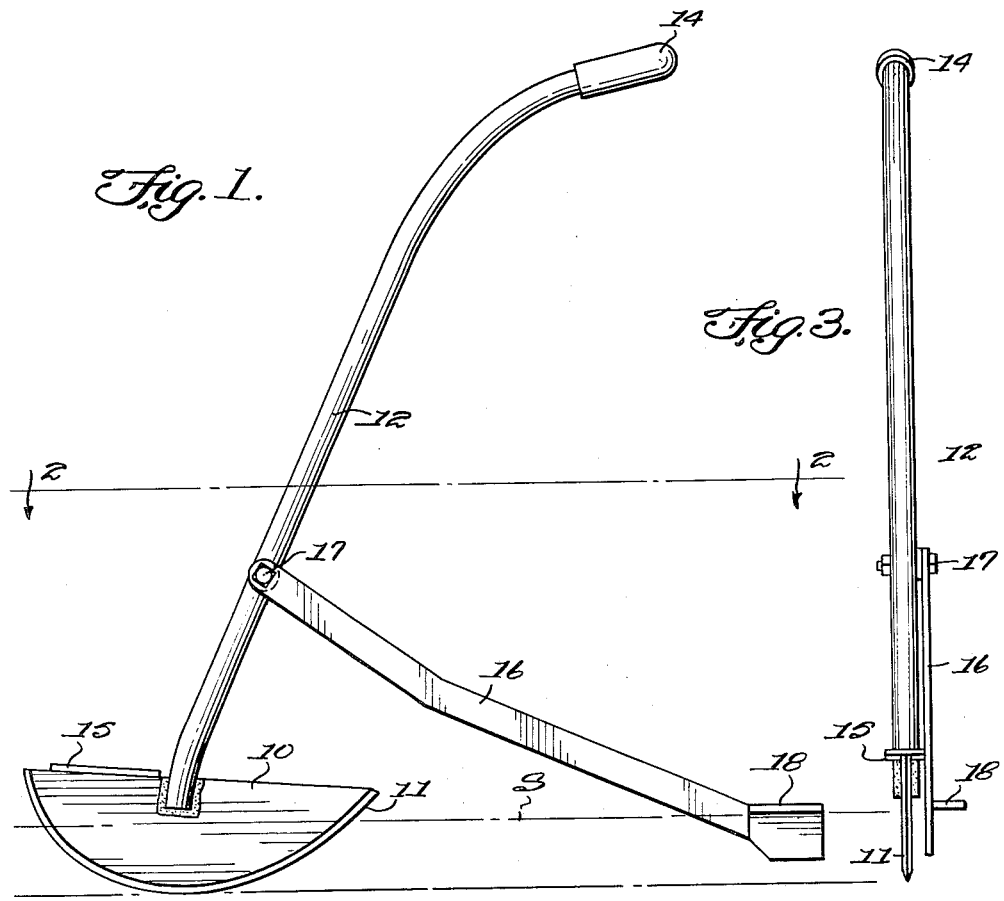
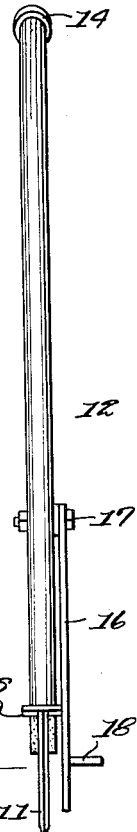
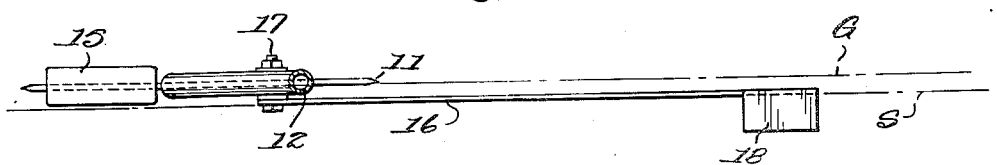
INVENTOR.
Freeman H. Davis,
BY Victor J. Evans & Co.
ATTORNEYS Patented Jan. 13, 1953

2,624,938

UNITED STATES PATENT OFFICE 2,624,938

GRASS EDGE CUTTER

Freeman H. Davis, Artesia, Calif.

Application September 28, 1950, Serial No. 187,206

1 Claim. (Cl. 30—124)

This invention relates to a grass cutter, and more particularly to a device for cutting grass that grows along the side of curbs or walks.

The object of the invention is to provide a lawn edge trimmer or cutter which will enable the user to easily and effectively cut grass growing at the side of a curb or walk.

Another object of the invention is to provide a grass cutter which can be easily manipulated, the cutter including a member for cleaning or removing the grass that has been trimmed by the cutter blade.

A further object of the invention is to provide a grass cutter which is extremely simple and inexpensive to manufacture.

Other objects and advantages will be apparent during the course of the following description.

In the accompanying drawings forming a part of this application, in which like numerals are used to designate like parts throughout the same:

Figure 1 is a side elevational view of the grass cutter constructed according to the present invention;

Figure 2 is a sectional view taken on the line 2—2 of Figure 1;

Figure 3 is an end elevational view of the grass cutter.

Referring in detail to the drawings, the numeral 10 designates a vertically disposed, flat cutting blade, Figure 1, and the cutting blade 10 is provided with an arcuate or curved cutting edge 11. A handle 12, which may be made of any suitable material, such as tubular steel, has its lower end secured, as by welding, to the blade 10. A hand grip 14 is mounted on the upper end of the handle 12, so as to facilitate manipulation of the device.

Secured to the upper end of the blade 10 is a horizontally disposed plate 15, and the plate 15 defines a foot rest for a purpose to be later described. A link or arm 16 has one end pivotally connected to the handle 12 by a bolt-and-nut assembly 17, and a drag member or cleaning element 18 is arranged on the other end of the link 16. The cleaner element 18 is preferably fabricated of angle iron.

In use, the cutter blade 10 is forced or pushed into the grass G, Figure 2, at the side of the sidewalk S by applying a downwardly directed pressure on the foot rest 15. Then, the handle 12 can be used to further force the cutting blade 10 downwardly to trim the grass and the cutting blade 10 can be oscillated or rocked back and forth by means of the handle 12, whereby the grass will be trimmed or cut as desired. Then, pressure on the foot pedal 15 is released, and the blade 10 can be raised by means of the handle 12. This will cause the scraper element 18 to move forwardly to thereby clean the grass that has been cut by the cutter blade 10.

I claim:

In a grass cutter, a blade having a lower cutting edge, arcuately shaped and adapted to trim the grass in close proximity to a sidewalk, said blade having a handle secured at its lower end to the center top portion of the blade, the improvement comprising an angularly arranged link pivoted at one end to said handle so that the link extends rearwardly of the handle in right angular relation thereto, a scraper element positioned on the other end of the link, said scraper element having the shape of an angle iron wherein one portion extends laterally of one edge of the link and rests on the pavement and the other portion thereof depends from the first portion and lies parallel to and follows the blade so as the blade is rocked by the handle the scraper element will clear grass previously cut by said blade, said one portion of said scraper element having an inclined leading edge.

FREEMAN H. DAVIS.

REFERENCES CITED

The following references are of record in the file of this patent:

UNITED STATES PATENTS

| Number | Name | Date |
|---|---|---|
| 1,826,250 | Jensen | Oct. 6, 1931 |
| 2,075,301 | Pipenhagen | Mar. 30, 1937 |
| 2,277,415 | Ruppert | Mar. 24, 1942 |
| 2,503,757 | Morgan | Apr. 11, 1950 |
| 2,540,597 | Riggs | Feb. 6, 1951 |